US006823683B2

(12) United States Patent
Amaral et al.

(10) Patent No.: US 6,823,683 B2
(45) Date of Patent: Nov. 30, 2004

(54) METHOD AND APPARATUS FOR REGULATING THE TEMPERATURE OF A MOTOR VEHICLE CABIN

(75) Inventors: Manuel Amaral, Vitry-sur-Seine (FR); Franck Vouzelaud, Paris (FR)

(73) Assignees: Peugeot Citroen Automobiles SA, Neuilly-sur-Seine (FR); Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/275,899

(22) PCT Filed: May 14, 2001

(86) PCT No.: PCT/FR01/01457

§ 371 (c)(1),
(2), (4) Date: Jan. 24, 2003

(87) PCT Pub. No.: WO01/87655

PCT Pub. Date: Nov. 22, 2001

(65) Prior Publication Data

US 2004/0089003 A1 May 13, 2004

(30) Foreign Application Priority Data

May 15, 2000 (FR) .......................................... 00 06116
Nov. 28, 2000 (FR) .......................................... 00 15363

(51) Int. Cl.[7] .......................... F25B 29/00; F25B 13/00; F25D 17/02; B60H 1/32
(52) U.S. Cl. ............................ 62/159; 62/435; 62/244; 62/324.1
(58) Field of Search ........................ 62/186, 159, 244, 62/435, 324.1

(56) References Cited

U.S. PATENT DOCUMENTS

| 2,893,218 | A | | 7/1959 | Harnish |
| 4,061,186 | A | * | 12/1977 | Ljung .......................... 165/59 |
| 5,265,437 | A | | 11/1993 | Saperstein et al. |
| 5,305,614 | A | * | 4/1994 | Gilles ........................ 62/238.7 |
| 5,337,574 | A | * | 8/1994 | Dick .............................. 62/89 |
| 5,421,169 | A | | 6/1995 | Benedict |
| 5,692,390 | A | * | 12/1997 | Karl et al. ................... 62/217 |
| RE37,464 | E | * | 12/2001 | Meckler ........................ 62/93 |

FOREIGN PATENT DOCUMENTS

| DE | 199 30 148 A1 | 1/2000 |
| FR | 2 697 210 A1 | 4/1994 |

* cited by examiner

Primary Examiner—William C. Doerrler
(74) Attorney, Agent, or Firm—Oliff & Berridge, PLC

(57) ABSTRACT

According to the method, heat delivered to the cabin (H) comes from a hot source (18) of a heat pump (12) comprising a main refrigerant circuit (14) taking heat from a cold source (16) to transfer it to the hot source (18). Heat taken from the cold source (16) comes from a flow of air recycled from the cabin. The cold source (16) has a refrigerant/coolant heat exchanger (24) thermally coupling the main circuit (14) to a first secondary coolant circuit (26) capable of being selectively connected to an outside heat exchanger (30) and to a cold heat exchanger (32). Air flow circuits have an inlet for admitting air recycled from the cabin, an outlet for delivering air to the outside of the vehicle, first connection means for connecting the recycled air inlet to the upstream end of the cold heat exchanger (32), and second connection means for connecting the downstream end of said cold heat exchanger (32) to the outside outlet.

19 Claims, 5 Drawing Sheets

METHOD AND APPARATUS FOR REGULATING THE TEMPERATURE OF A MOTOR VEHICLE CABIN

The present invention relates to a method and to apparatus for regulating the temperature of a motor vehicle cabin.

The state of the art, and in particular FR-2 697 210 discloses a method of regulating the temperature of a motor vehicle cabin, which method is of the type in which heat is delivered to the cabin from a hot source of a heat pump having a compressor circuit for a refrigerant fluid that takes heat from a cold source and transfers at least part of that heat to the hot source.

The compression circuit generally comprises an evaporator in heat exchange with the cold source, and a condenser in heat exchange with the hot source, these elements being interconnected by a compressor and an expander. The refrigerant vaporizes in the evaporator, thereby taking heat from the cold source. The compressor draws in the vaporized refrigerant and delivers it into the condenser cooled by heat exchange with the hot source, and the refrigerant condenses in the condenser. The expander allows the refrigerant in the liquid state to pass to the evaporator by lowering its pressure.

A heat pump can be used either to heat a space or a part, or else to cool said space or said part.

In FR-2 697 210, the cold source has firstly a first refrigerant/coolant heat exchanger thermally coupling the refrigerant circuit which constitutes a main circuit with a first secondary coolant circuit, and secondly the hot source has a second refrigerant/coolant heat exchanger thermally coupling the main refrigerant circuit to a second secondary coolant circuit.

The secondary circuits are capable of being selectively connected via appropriate valves to an outside heat exchanger placed in the vehicle engine compartment, and to an inside heat exchanger placed in the vehicle cabin. By acting on the valves, the heat pump can be used either to refrigerate the vehicle cabin (in this first case, the hot source is the outside heat exchanger and the cold source is the inside heat exchanger), or else to heat the cabin (in this second case the hot source is the inside heat exchanger and the cold source is the outside heat exchanger).

It should be observed that in the second case, the performance of the heat pump is limited by the temperature of the outside air. In the cold season, air temperature limits the efficiency of the heat pump while it is being used for the purposes of heating the cabin. Furthermore, frosting of the cold source in the cold season can harm the operating performance of the heat pump.

An object of the invention is to optimize the performance of temperature regulation apparatus using a heat pump, in particular when it is used for heating the cabin of a motor vehicle.

To this end, the invention provides a method of regulating the temperature of a motor vehicle cabin of the above-specified type, characterized in that heat coming from a flow of recycled cabin air is taken from the cold source.

The invention also provides apparatus for implementing the above-defined method, the apparatus being characterized in that the cold source comprises a first refrigerant/coolant heat exchanger thermally coupling the main refrigerant circuit to a first secondary coolant circuit capable of being selectively connected to an "outside" heat exchanger and to a "cold" heat exchanger, and in that the hot source comprises a second refrigerant/coolant heat exchanger thermally coupling the main refrigerant circuit to a second secondary coolant circuit capable of being selectively connected to the outside heat exchanger and to a "hot" heat exchanger.

According to other characteristics of this apparatus:

the cold and hot heat exchangers are coolant/air heat exchangers;

the cold and hot heat exchangers are arranged in an air conditioning unit preferably disposed in the cabin, the unit defining air flow circuits passing through the cold and hot heat exchangers;

the air flow circuits comprise a "recycled" air inlet for air recycled from the cabin, an "outside" outlet for delivering air to the outside of the vehicle, first connection means for connecting the recycled air inlet to the upstream end of the cold heat exchanger, and second connection means for connecting the downstream end of said cold heat exchanger to the outside outlet;

the second connection means comprise air distribution means for distributing air to the upstream end of the hot heat exchanger and to the outside outlet;

the air flow circuits comprise an "outside" air inlet for admitting air from outside the vehicle, a "cabin" air outlet for delivering air to the cabin, third connection means for connecting the outside air inlet to the upstream end of the hot heat exchanger, and fourth connection means for connecting the downstream end of the hot heat exchanger to the cabin outlet;

the third connection means comprise air distribution means for distributing air to the upstream end of the hot heat exchanger and to the upstream of the cold heat exchanger;

the air conditioning unit comprises means for driving air, said means being arranged upstream or downstream from the cold heat exchanger; and the air conditioning unit comprises means for driving air, said means being arranged upstream or downstream from the hot heat exchanger.

The invention will be better understood on reading the following description given purely by way of example and made with reference to the accompanying drawings, in which:

FIGS. 1 to 3 show motor vehicle temperature regulation apparatus constituting a first embodiment of the invention, and given overall reference 10.

Figure 1:
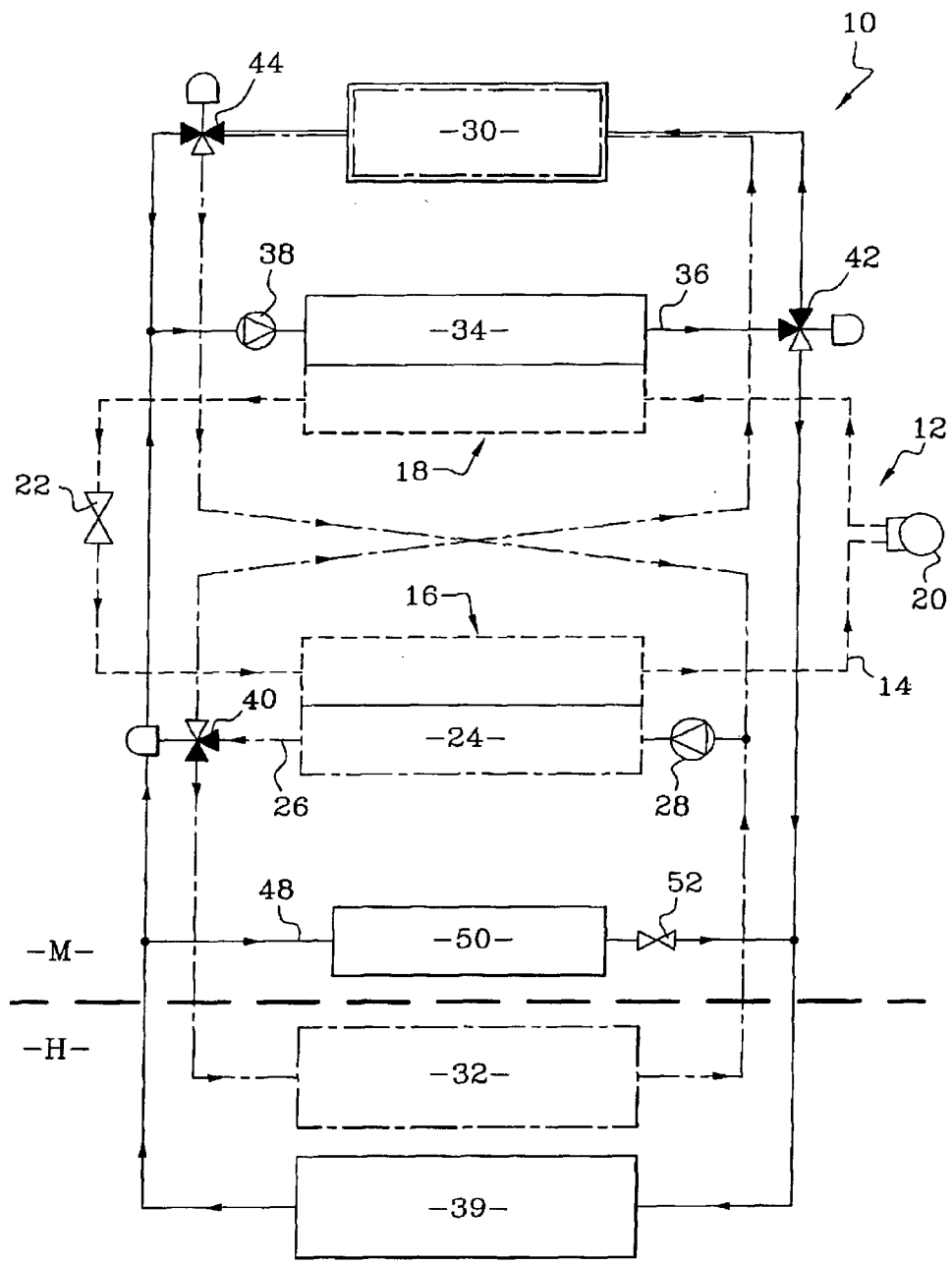
FIGS. 1 to 3 are diagrammatic views in three respective different configurations of use showing apparatus of the invention for regulating the temperature of a motor vehicle.

In the description below, two parts are said to be thermally coupled together when they exchange heat between each other by means of a suitable heat exchanger.

The temperature regulation apparatus 10 comprises a heat pump 12 having a main refrigerant circuit 14 of the compression type taking heat from a cold source 16 and transferring at least some of it to a hot source 18.

The cold and hot sources 16 and 18 are connected together by a compressor 20 (electrically or mechanically driven) and an expander valve 22. The refrigerant vaporizes taking heat from the cold source 16. the compressor 20 draws in the vaporized refrigerant and delivers it to the hot source where it condenses and cools. The expander valve 22 allows the refrigerant to pass in liquid form towards the cold source 16 by lowering its pressure. The refrigerant circulates around the circuit 14 in the direction marked by arrows in FIG. 1.

The cold source 16 comprises a first refrigerant/coolant heat exchanger 24 thermally coupling the main refrigerant circuit 14 to a first secondary circuit 26 for liquid coolant. This circuit includes a pump 28 for circulating the liquid coolant, which pump is connected to the inlet of the first heat exchanger 24.

The first secondary circuit 26 is capable of being selectively connected to an "outside" heat exchanger 30 and to a "cold" heat exchanger 32.

Figure 2:
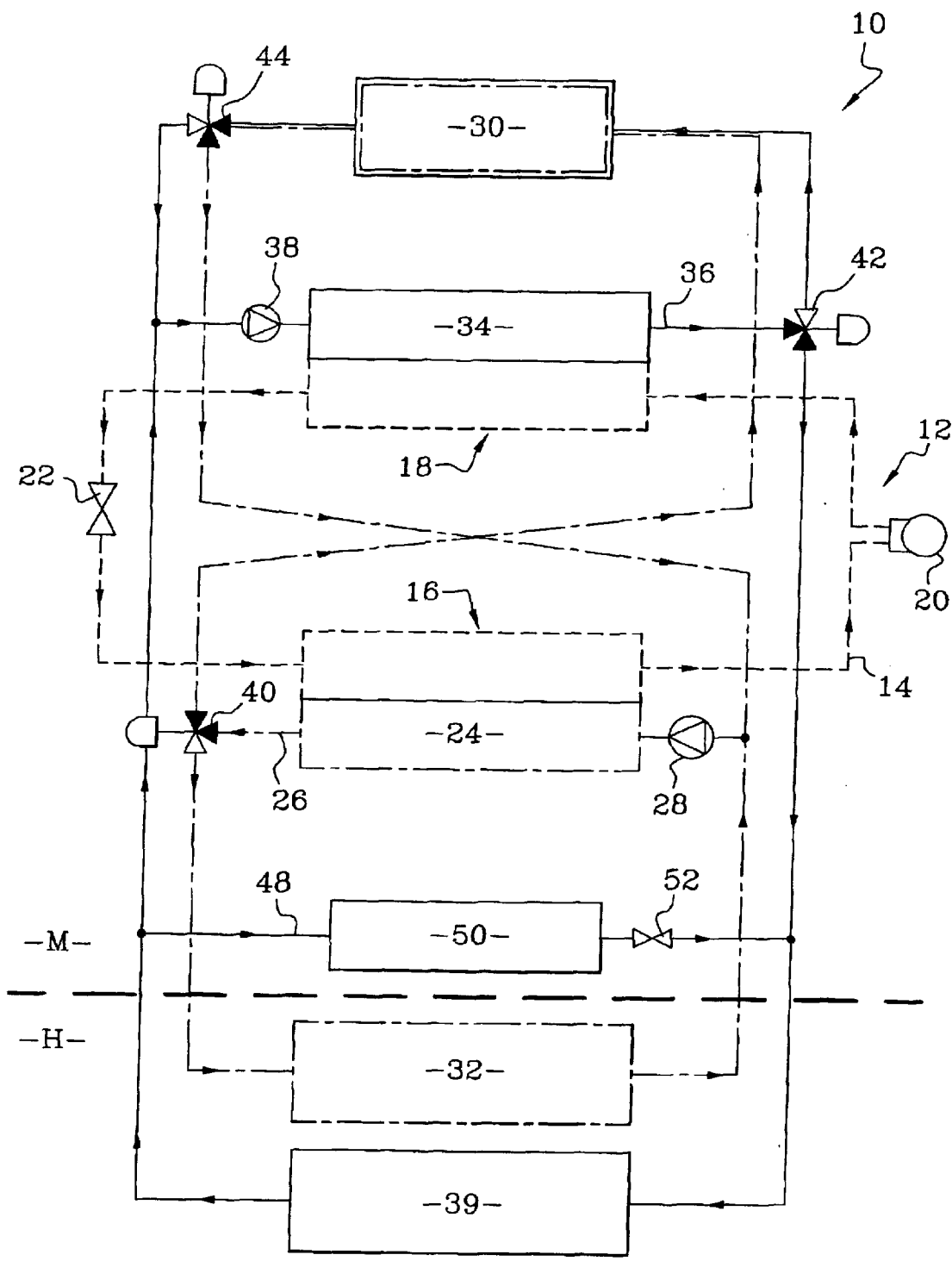
Figure 3:
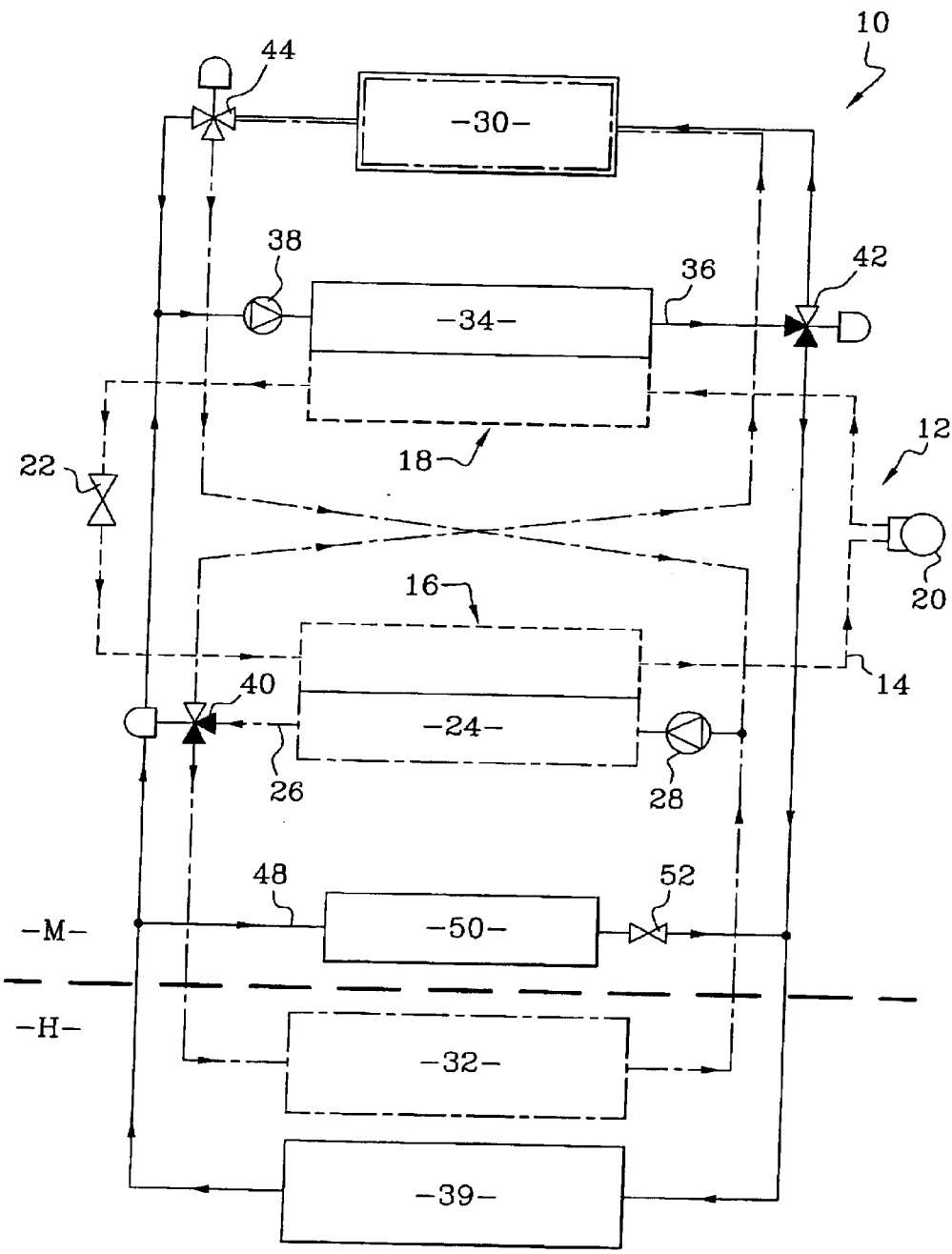

In the example shown in FIGS. 1 to 3, the outside heat exchanger 30 is a coolant/air heat exchanger placed in the engine compartment M of the vehicle, and the cold heat exchanger 32 is a coolant/air heat exchanger placed in the vehicle cabin H.

The hot source 18 has a second refrigerant/coolant heat exchanger 34 thermally coupling the main refrigerant circuit 14 to a second secondary circuit 36 for liquid coolant. This second secondary circuit comprises a pump 38 for circulating the liquid coolant, which pump is connected to the inlet of the second heat exchanger 34.

The second secondary circuit 36 is capable of being selectively connected to the outside heat exchanger 30 and to a "hot" heat exchanger 39.

In the example shown in FIGS. 1 to 3, the hot heat exchanger 39 is a coolant/air heat exchanger placed in the vehicle cabin H.

A conventional fan (not shown in the figures) serves to cause a flow of air to circulate through the cold and hot heat exchangers 32 and 39.

The heat pump 12 connected to the first and second heat exchangers 24 and 34 is located, for example, in the engine compartment of the vehicle.

The refrigerant circulating in the main circuit is of conventional type. The refrigerant is selected, for example, from chlorine and fluorine derivatives of methane or ethane (Freon), hydrocarbons, ammonia, or carbon dioxide. The coolant liquid circulating in the first or second secondary circuits 26 or 36 is preferably a mixture of water and antifreeze (glycol).

The two secondary coolant circuits 26, 36 are connected to the outside, cold, and hot heat exchangers 30, 32, and 39 respectively by means of a three-port valve 40 of the first secondary circuit, a three-port valve 42 of the second secondary circuit, and a three-port valve 44 common to both secondary circuits.

The three-port valve 40 of the first secondary circuit 26 is connected to the outlet of the first refrigerant/coolant heat exchanger 24 of the cold source, to the inlet of the outside heat exchanger 30, and to the inlet of the cold heat exchanger 32.

The valve 42 of the second secondary circuit 36 is connected to the outlet of the second refrigerant/coolant heat exchanger 34 of the hot source, to the inlet of the outside heat exchanger 30, and to the inlet of the hot heat exchanger 39.

The valve 44 common to the first and second secondary coolant circuits 26 and 36 is connected to the inlet of the first refrigerant/coolant heat exchanger 24 of the cold source, to the inlet of the second refrigerant/coolant heat exchanger 34 of the hot source, and to the outlet of the outside heat exchanger 30.

The valves 40 to 44 are controlled by conventional electrical, mechanical, thermomechanical, or pneumatic means.

The heat exchanger 39 is suitable for taking heat from the vehicle engine cooling liquid and delivering it to the cabin.

For this purpose, the heat exchanger 39 is connected to a branch 48 of a cooling liquid circuit for the vehicle engine 50. Naturally, this engine is located in the engine compartment M. The downstream end of the branch 48 is connected to a coolant inlet of the hot heat exchanger 39. The upstream end of the branch 48 is connected to a coolant outlet of the hot heat exchanger 39. Where appropriate, a valve 52 serves to adjust the flow rate of the cooling liquid circulating in the hot heat exchanger 39, coming from the upstream end of the branch 48.

The vehicle cabin can thus be heated by means of heat taken from the engine cooling circuit by using the hot heat exchanger 39, and without resorting to an additional heat exchanger specific to the cooling circuit.

FIG. 1 shows the configuration of the temperature regulation apparatus 10 in vehicle cabin refrigerating mode. In this configuration, the valves 40 to 44 are set so as to connect the first secondary coolant circuit 26 to the cold heat exchanger 32 and the second secondary coolant circuit 36 to the outlet heat exchanger 30.

The coolant of the first secondary circuit 26 takes heat from the cabin via the cold heat exchanger 32 and delivers it to the vaporized refrigerant via the first refrigerant/coolant heat exchanger 24.

The coolant of the second secondary circuit 36 takes heat from the condensed refrigerant via the second refrigerant/coolant heat exchanger 34 and delivers it to the outside of the vehicle via the outside heat exchanger 30.

FIG. 2 shows the apparatus 10 in a first configuration for heating the cabin. In this configuration, the valves 40 to 44 are set so as to connect the first secondary coolant circuit 26 to the outside heat exchanger 30 and the second secondary coolant circuit 36 to the hot heat exchanger 39.

The coolant of the first secondary circuit 26 takes heat from outside the vehicle via the outside heat exchanger 30 and delivers it to the vaporized refrigerant via the first refrigerant/coolant heat exchanger 24.

The coolant of the second secondary circuit 36 takes heat from the condensed refrigerant via the second refrigerant/coolant heat exchanger 34 and delivers it to the cabin, via the hot heat exchanger 39.

Where appropriate, the valve 52 is opened at least partially so as to allow the hot heat exchanger 39 to provide the cabin with heat taken from the vehicle engine cooling liquid.

FIG. 3 shows the apparatus 10 in a second cabin heating configuration. In this configuration, the valves 42 and 44 are set as in FIG. 2 except that the second secondary coolant circuit 36 is connected to hot heat exchanger 39. The valve 40 is set in such a manner as to connect the first secondary coolant circuit 26 to the cold heat exchanger 32.

The coolant of the first secondary circuit 26 takes heat from the cabin (more particularly from a flow of recycled cabin air, as explained in greater detail below), via the cold heat exchanger 32, and delivers it to the vaporized refrigerant via the first refrigerant/coolant heat exchanger 24.

The coolant of the second secondary circuit 26 takes heat from the condensed refrigerant via the second refrigerant/coolant heat exchanger 34 and delivers it to the cabin via the hot heat exchanger 39.

In its second heating configuration, the apparatus 10 enables heat coming from a flow of recycled cabin air to be taken from the cold source 16.

As in the first heating configuration of the apparatus 10 shown in FIG. 2, the valve 52 can be at least partially open so as to allow the heat exchanger 39 to supply the cabin with heat taken from the vehicle engine cooling liquid.

Naturally, the valves 40 to 44 can be set in configurations that are intermediate relative to the cabin cooling and heating configurations shown in FIGS. 1 to 3, for example in order to accelerate cabin heating while contributing to controlling the relative humidity in the cabin.

Figure 4:
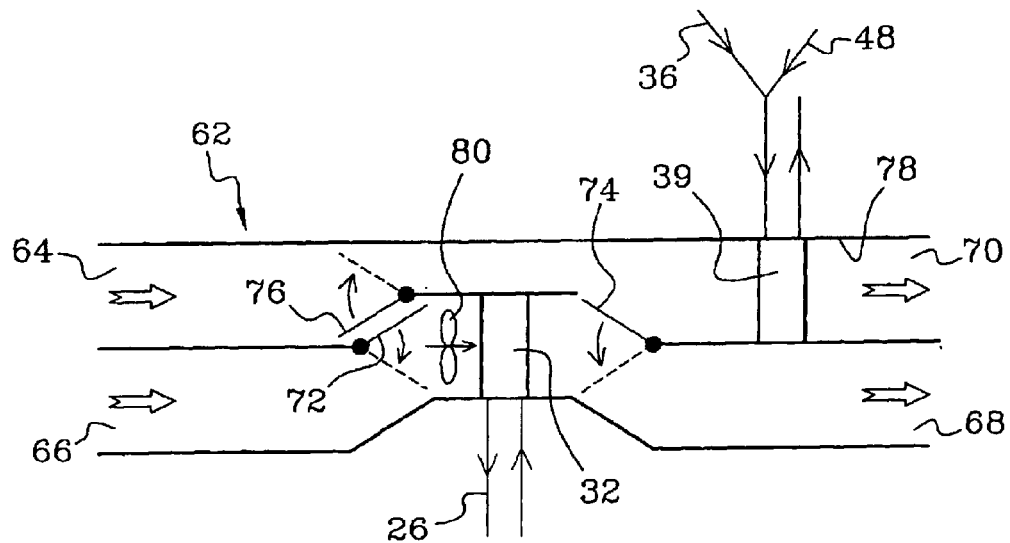
FIG. 4 is a diagrammatic view of an air conditioning unit for the apparatus shown in the preceding figures.

In order to be able to regulate cabin temperature by configuring the apparatus 10 as shown in FIGS. 1 to 3, and more particularly as shown in FIG. 3 (second cabin heating configuration), the cold heat exchanger 32 and the hot heat exchanger 39 are disposed in an air conditioning unit 62 as shown in FIG. 4.

The air conditioning unit 62 placed inside the cabin defines air flow circuits passing through the cold and hot heat exchangers 32 and 39. The air flow circuits comprise an inlet for air from outside the vehicle, referred to as the "outside" air inlet 64, an inlet for air recycled from the cabin, referred to as the "recycled" air inlet 66, an outlet for delivering air to the outside of the cabin, referred to as the "outside" inlet 68, and an outlet for delivering air to the cabin, referred to as the "cabin" outlet 70.

The air flow circuits also comprise first means for connecting the recycled air inlet 66 to the upstream end of the cold heat exchanger 32, said means comprising a flap 72, for example, and second means for connecting the downstream end of this cold heat exchanger 32 to the outside outlet 68, said means comprising a flap 74, for example.

The flap 72 can be moved between two extreme positions for maximum and minimum recycled air flow as represented respectively by a continuous line and by a dashed line in FIG. 4.

The flap 74 constitutes a part for distributing air to the upstream of the hot heat exchanger 39 and to the outside outlet 68. Thus, the flap 74 is movable between two extreme positions for maximum air flow firstly to the outside outlet 68 and secondly to the upstream of the hot heat exchanger 39, these positions being represented respectively by a continuous line and by a dashed line in FIG. 4.

The air flow circuits also comprise third connection means for connecting the outside air inlet 64 to the upstream end of the hot heat exchanger 39, e.g. comprising a flap 76, and fourth means for connecting the downstream end of the hot heat exchanger 39 to the cabin outlet 70, comprising a connection duct 78 provided where appropriate with an air flow rate adjusting part (not shown).

The flap 76 serves to distribute air between the upstream end of the hot heat exchanger 39 and the downstream end of the cold heat exchanger 32. Thus, the flap 76 can be moved between two extreme positions providing firstly maximum air flow towards the upstream end of the hot heat exchanger 39 and secondly towards the upstream end of the cold heat exchanger 32, these positions being represented respectively by a continuous line and by a dashed line in FIG. 4.

Air drive means such as a fan device 80 are arranged upstream from the cold heat exchanger 32, as shown in FIG. 4, or downstream from said cold heat exchanger 32.

Figure 6:
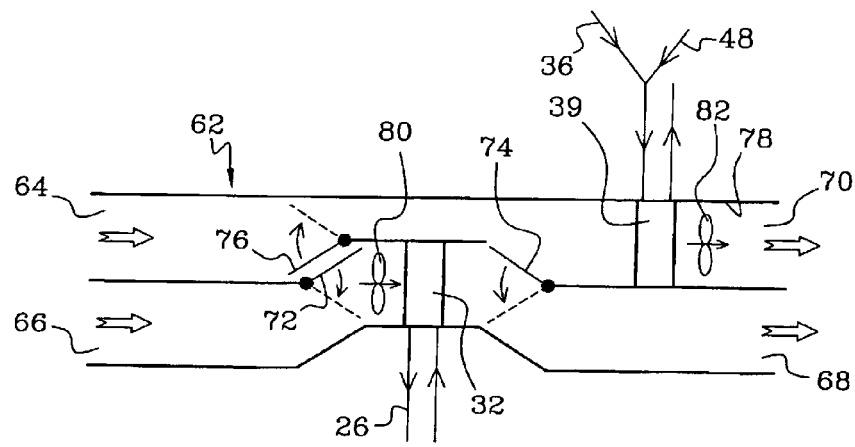
FIGS. 6 and 7 show variant embodiments of the air conditioning unit shown in FIG. 4.
Figure 7:
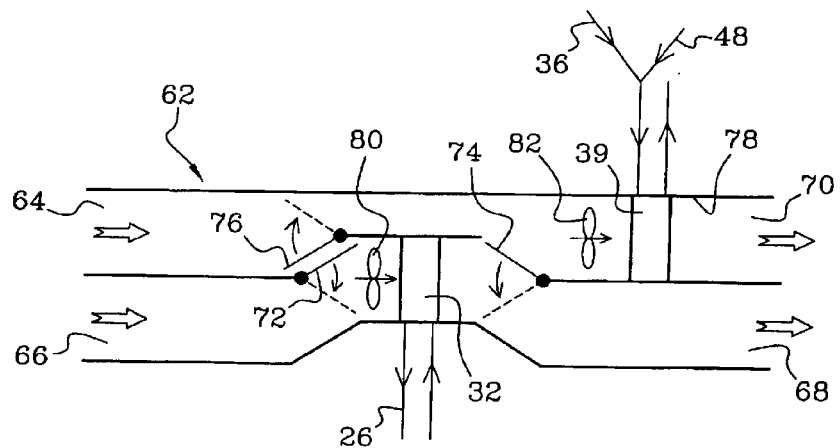

In a variant, additional air drive means such as an additional fan device 82 can be arranged downstream (see FIG. 6) or upstream (see FIG. 7) of the hot heat exchanger 39.

The recycled air inlet 66 is preferably connected to orifices for taking air from the cabin that are arranged in the rear portion thereof.

Figure 5:
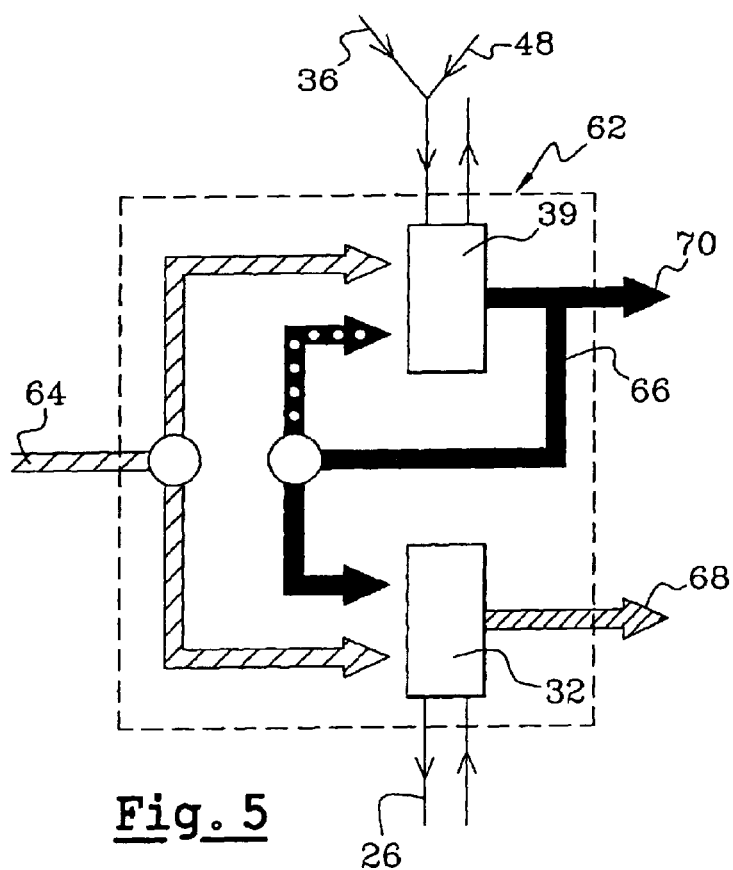
FIG. 5 is a functional diagram showing the flows of air passing through the air conditioning unit shown in FIG. 4.

FIG. 5 shows the principle on which the air conditioning unit 62 operates.

In FIG. 5, the air flows are represented by broad arrows. Each hot or cold heat exchanger 32 or 39 can be fed at its upstream end with air coming from outside the vehicle (shaded two-branched arrow 64 on the left in FIG. 5) and by a flow of air recycled from the cabin (solid line two-branched arrow 66 on the left of FIG. 5).

The air flow downstream from the hot heat exchanger 39 can be directed to the cabin (solid line arrow 70 on the right of FIG. 5). The air flow downstream from the cold heat exchanger 32 can be delivered to the outside of the vehicle (shaded arrow 68 to the right in FIG. 5), or where appropriate, to the upstream end of the hot heat exchanger 39.

When the apparatus 10 is configured so as to cool the vehicle cabin without heating the air flow but taking air from outside the vehicle, as shown in FIG. 1, the flaps 72 to 76 are placed in their positions represented by dashed lines in FIG. 4, for example. Thus, since the hot heat exchanger 39 is deactivated, the outside air flows through the cold heat exchanger 32 and is then delivered to the cabin without cycling.

When the apparatus 10 is in its first heating configuration, as shown in FIG. 2, the flap 76 is moved from the preceding position so as to occupy its position represented by a continuous line in FIG. 4, for example. Thus, the outside air passes through the hot heat exchanger 39 (which in this configuration is activated), and is then delivered to the cabin.

When the apparatus 10 is in its second heating configuration, as shown in FIG. 3, the flaps 72 to 76 are placed in their positions represented by continuous lines in FIG. 4. Thus, the flow of air recycled from the cabin passes through the cold heat exchanger 32 and is then sent towards the outside of the vehicle while the hot heat exchanger 39 has a flow of outside air passing therethrough as in the first heating configuration.

Naturally, the flaps 72 to 74 can be set into positions that are intermediate relative to those described above in order to combine various recycled and outside air flows through the hot and cold heat exchangers 39 and 32.

The second heating configuration of the apparatus 10 as shown in FIG. 3 is particularly well adapted to heating the cabin in the cold season.

In this second heating configuration, the first secondary circuit 26 is connected to the cold heat exchanger 32 which, on coming into contact with air recycled from the cabin, is unlikely to frost. The cold heat exchanger 32 acts as a cold source for the coolant circulating in the first secondary circuit 36, which cold source is hotter than the outside heat exchanger 30 connected to the first secondary circuit 26 in the first heating configuration of the apparatus 10 as shown in FIG. 2.

It should be observed that when the flaps 72 to 76 are set into their continuous line positions shown in FIG. 4, the hot heat exchanger 39 passes solely a flow of air taken from outside the vehicle and that is not recycled, thus reducing any risk of mist forming on the cabin windows.

Amongst the advantages of the invention, it should be observed that when the apparatus 10 is in its second heating configuration, the operation of the heat pump 12 is optimized because the cold heat exchanger 32 acts as a cold source relative to the coolant circulating in the first secondary circuit 26, which cold source is hotter than the outside heat exchanger 30.

In addition, in the cold season, the second heating configuration of the apparatus 10 enables the temperature inside the cabin to be raised more quickly than is possible with the first heating configuration of the apparatus 10. This advantage occurs in particular because heat taken from the cold source 16 comes from a flow of recycled cabin air at a temperature which is higher than the temperature of the outside air.

What is claimed is:

1. Motor vehicle temperature regulation apparatus comprising:
a heat pump comprising a main compression circuit for a refrigerant fluid that takes heat from a cold source to transfer the heat to a hot source;
the cold source comprising a first heat exchanger for exchanging heat between the refrigerant fluid and a coolant liquid, thermally coupling the main refrigerant circuit to a first secondary coolant circuit capable of being selectively connected to at least two heat exchangers; and
the hot source comprising a second heat exchanger for exchanging heat between the refrigerant fluid and a coolant liquid, thermally coupling the main refrigerant circuit to a second secondary coolant circuit capable of being selectively connected to two heat exchangers;
wherein the first secondary circuit is capable of being selectively connected to an "outside" heat exchanger and to a "cold" heat exchanger, and
wherein the second secondary circuit is capable of being selectively connected to the outside heat exchanger and to a "hot" heat exchanger,
the apparatus further comprising a unit that forms a flow of recycled cabin air passing through the cold heat exchanger.

2. Apparatus according to claim 1, characterized in that the cold and hot heat exchangers are coolant/air heat exchangers.

3. Apparatus according to claim 2, characterized in that the cold and hot heat exchangers are arranged in an air conditioning unit preferably disposed in the cabin, the unit defining air flow circuits passing through the cold and hot heat exchangers and forming the unit for forming a flow of recycled cabin air passing through the cold heat exchanger.

4. Apparatus according to claim 3, characterized in that the air flow circuits comprise a "recycled" air inlet for air recycled from the cabin, an "outside" outlet for delivering air to the outside of the vehicle, first connection means for connecting the recycled air inlet to the upstream end of the cold heat exchanger, and second connection means for connecting the downstream end of said cold heat exchanger to the outside outlet.

5. Apparatus according to claim 4, characterized in that the second connection means comprise air distribution means for distributing air to the upstream end of the hot heat exchanger and to the outside outlet.

6. Apparatus according to claim 4, characterized in that the air flow circuits comprise an "outside" air inlet for admitting air from outside the vehicle, a "cabin" air outlet for delivering air to the cabin, third connection means for connecting the outside air inlet to the upstream end of the hot heat exchanger, and fourth connection means for connecting the downstream end of the hot heat exchanger to the cabin outlet.

7. Apparatus according to claim 6, characterized in that the third connection means comprise air distribution means for distributing air to the upstream end of the hot heat exchanger and to the upstream of the cold heat exchanger.

8. Apparatus according to claim 3, characterized in that the air conditioning unit comprises means for driving air, said means being arranged upstream or downstream from the cold heat exchanger.

9. Apparatus according to claim 3, characterized in that the air conditioning unit comprises means for driving air, said means being arranged upstream or downstream from the hot heat exchanger.

10. Apparatus according to claim 5, characterized in that the air flow circuits comprise an "outside" air inlet for admitting air from outside the vehicle, a "cabin" air outlet for delivering air to the cabin, third connection means for connecting the outside air inlet to the upstream end of the hot heat exchanger, and fourth connection mean for connecting the downstream end of the hot heat exchanger to the cabin outlet.

11. Apparatus according to claim 4, characterized in that the air conditioning unit comprises means for driving air, said means being arranged upstream or downstream from the cold heat exchanger.

12. Apparatus according to claim 5, characterized in that the air conditioning unit comprises means for driving air, said means being arranged upstream or downstream from the cold heat exchanger.

13. Apparatus according to claim 6, characterized in that the air conditioning unit comprises means for driving air, said means being arranged upstream or downstream from the cold heat exchanger.

14. Apparatus according to claim 7, characterized in that the air conditioning unit comprises means for driving air, said means being arranged upstream or downstream from the cold heat exchanger.

15. Apparatus according to claim 4, characterized in that the air conditioning unit comprises means for driving air, said means being arranged upstream or downstream from the hot heat exchanger.

16. Apparatus according to claim 5, characterized in that the air conditioning unit comprises means for driving air, said means being arranged upstream or downstream from the hot heat exchanger.

17. Apparatus according to claim 6, characterized in that the air conditioning unit comprises means for driving air, said means being arranged upstream or downstream from the hot heat exchanger.

18. Apparatus according to claim 7, characterized in that the air conditioning unit comprises means for driving air, said means being arranged upstream or downstream from the hot heat exchanger.

19. Apparatus according to claim 8, characterized in that the air conditioning unit comprises means for driving air, said means being arranged upstream or downstream from the hot heat exchanger.

* * * * *